US012683702B2

(12) United States Patent
Striffler

(10) Patent No.: US 12,683,702 B2
(45) Date of Patent: Jul. 14, 2026

(54) DETERMINING A RESIDENCE TIME IN A PORTION OF A NETWORK

(71) Applicant: Siemens Aktiengesellschaft, Munich (DE)

(72) Inventor: Tobias Striffler, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 291 days.

(21) Appl. No.: 18/554,750

(22) PCT Filed: Apr. 12, 2022

(86) PCT No.: PCT/EP2022/059680
§ 371 (c)(1),
(2) Date: Oct. 10, 2023

(87) PCT Pub. No.: WO2022/218948
PCT Pub. Date: Oct. 20, 2022

(65) Prior Publication Data
US 2024/0214099 A1 Jun. 27, 2024

(30) Foreign Application Priority Data
Apr. 15, 2021 (EP) ..................................... 21168513

(51) Int. Cl.
*H04J 3/06* (2006.01)
(52) U.S. Cl.
CPC .......... *H04J 3/0673* (2013.01); *H04J 3/0667* (2013.01)

(58) Field of Classification Search
None
See application file for complete search history.

(56) References Cited

U.S. PATENT DOCUMENTS

| | | | | |
|---|---|---|---|---|
| 8,064,485 B1 | 11/2011 | Montini et al. | ............... | 370/503 |
| 2011/0051754 A1 | 3/2011 | Lansdowne | ................... | 370/503 |
| 2019/0322299 A1* | 10/2019 | Mong | ................ | B61L 15/0072 |

(Continued)

FOREIGN PATENT DOCUMENTS

| | | |
|---|---|---|
| CN | 102577194 A | 7/2012 |
| CN | 103117845 A | 5/2013 |

OTHER PUBLICATIONS

Search Report for International Application No. PCT/EP2022/059680, 13 pages, Sep. 5, 2022.

(Continued)

*Primary Examiner* — Lonnie V Sweet
(74) *Attorney, Agent, or Firm* — Slayden Grubert Beard PLLC

(57) ABSTRACT

Various embodiments disclosed herein include methods and systems for determining a residence time of a synchronization message according to a precision time protocol or PTP wherein the synchronization message is transmitted through a section or portion of a network. While transparent clocks are usually regarded as monolithic devices, a residence time may be determined as a time for traversing devices or nodes distributed within a network or within a portion of a network. The present embodiments may be particularly useful for 5G wireless communication network having TSN capabilities or, in other words, operating as a 5G-TSN integrated network.

19 Claims, 1 Drawing Sheet

(56)                    References Cited

U.S. PATENT DOCUMENTS

| 2020/0021378 A1* | 1/2020 | Aweya | H04J 3/0673 |
| 2021/0099341 A1 | 4/2021 | Moon | H04L 12/24 |
| 2021/0288736 A1* | 9/2021 | Guignard | H04J 3/0667 |
| 2022/0248354 A1* | 8/2022 | Aijaz | H04W 56/004 |
| 2022/0394647 A1* | 12/2022 | Moon | H04J 3/0667 |

OTHER PUBLICATIONS

Search Report for EP Application No. 21168513.6, 10 pages, Oct. 25, 2021.
"3rd Generation Partnership Project; Technical Specification Group Servicesand System Aspects; Study on enhanced support of Industrial Internet of Things (IIoT) in the 5G System (5GS) (Release 17)"; 3GPP Draft; SP-210102.ZIP 23700-20-DIFF V100-V200, 3rd Generation Partnership Project (3GPP), Mobile Competence Centre 650, Route Des Lucioles, F-06921 Sophia-Antipolis Cedex, France; 6), XP051988119, Mar. 16, 2021.

IEEE 1588 protocol currently revised in a draft version D1.6, »Draft Standard for a Precision Clock Synchronization Protocol for Networked Measurement and Control Systems«, edited by the IEEE Instrumentation and Measurements Society, Aug. 1, 2019.
Samsung: "Information Carried Inside 5G System for the UL"; 3GPP Draft; S2-1907706 23.501 CR Info Carried Inside 5GS for the UL, 3rd Generation Partnership Project (3GPP), Mobile Competence Centre; 650, Route Des Lucioles ; F-06921 Sophia-Antipolis Cedex FR; vol. SA WG2, No. Sapporo, Japan; pp. 20190624-20190628, , XP051752672, Jun. 18, 2019.
NTT, DOCOMO et al: "Support for PTP in time synchronization service and BMCA"; 3GPP Draft, S2-2102071, 3rd Generation Partnership Project (3GPP), Mobile Competence Centre, 650, Route Des Lucioles, F-06921 Sophia-Antipolis Cedex, France; Application No. EP 21 16 8513 Classification of the Application (IPC) Technical Fields Searched (IPC); vol. SA WG2, No. Electronic Meeting, pp. 20210224-20210309, XP051985120, Mar. 10, 2021.
Chinese Notice of Allowance, Application No. 202280028444.9, 4 pages.

* cited by examiner

DETERMINING A RESIDENCE TIME IN A PORTION OF A NETWORK

CROSS-REFERENCE TO RELATED APPLICATIONS

This application is a U.S. National Stage Application of International Application No. PCT/EP2022/059680 filed Apr. 12, 2022, which designates the United States of America, and claims priority to EP Application No. 21168513.6 filed Apr. 15, 2021, the contents of which are hereby incorporated by reference in their entirety.

TECHNICAL FIELD

The present disclosure relates to determining a residence time in a portion of a network. Some embodiments include methods and/or systems for determining a residence time of a synchronization message according to a precision time protocol wherein the synchronization message is transmitted through a section or portion of a network.

BACKGROUND

In a network such as a packet-switched communication network, a master node may send to one or more slave nodes synchronization information formatted according to a synchronization protocol. In some cases, the master node typically generates synchronization information related to its local clock (frequency and/or time of the day) and sends this information to the slave nodes within synchronization packets. Once the synchronization information is received at the slave nodes, it allows the slave nodes to synchronize the frequency and/or the time of the day of their respective clocks to those of the master node local clock.

An example of known synchronization protocols is the IEEE 1588 protocol, known as»Precision Time Protocol«, PTP, and currently revised in a draft version D1.6 laid open in a draft document entitled»Draft Standard for a Precision Clock Synchronization Protocol for Networked Measurement and Control Systems«, edited by the IEEE Instrumentation and Measurements Society on August, 2019.

According to the Precision Time Protocol, a transparent clock is specified as a network node or device forwarding a PTP synchronization message and updating the synchronization message with a time span spent in the transparent clock. Said time span is known as a residence time. Residence time may also be referred to as latency or delay.

According to a 3GPP Draft entitled»3rd Generation Partnership Project; Technical Specification Group Services and System Aspects; Study on enhanced support of Industrial Internet of Things (IIoT) in the 5G System (5GS) (Release 17), Chapters/»Clauses«1-6, pages 13-87 enhancements to a fifth generation or 5G Wireless Communication System for enabling enhanced support of IEEE TSN (Time-Sensitive Networking) Communication are disclosed. The objective is to introduce support for Time Synchronization with TSN GM in a TSN network attached to the device.

US 2021099341A1 describes a method for providing time synchronization between terminals by interconnecting a time sensitive network (TSN) with a 5G system (5GS) as a wireless communication system. Although D2 generally recognizes a need for determining a residence Time in a portion of a network, it does not provide any quantitative instructions on how to do this.

According to a Change Request No. S2-1907706 entitled-»Information Carried Inside 5G System for the UL«, 7 unpaginated pages, 3GPP TSG-SA WG2 Meeting #134, Sapporo, Japan, 2019-06-24-2019-06-28 an amendment to the 3GPP proposal is proposed. This amendment addresses the problem in that the value of a correction factor of a received time synchronization information is equal to a ratio of the frequency of the grandmaster to the frequency of a local clock entity of the time-aware system at the other end of the link attached to this port.

In a Change Request No. S2-2102071 entitled»Support for PTP in time synchronization service and BMCA«, 15 unpaginated pages, 3GPP TSG-SA WG2 Meeting #143e, Electronic Meeting, 2021-02-24-2021-03-09, the purpose of adding support for PTP (Precision Time Protocol) and BMCA (Best Master Clock Algorithm) is addressed for deciding which of at least two clocks should act as a master clock.

While transparent clocks are usually regarded as monolithic devices, a residence time in accordance with the techniques of this disclosure may also be determined as a time for traversing devices or nodes distributed within a network or within a portion of a network.

SUMMARY

The teachings herein generally describe methods and/or systems for determining a residence time of a synchronization message traversing a portion of a network. For example, in some embodiments, the synchronization message is received by an ingress node which may be located at one edge of said portion of the network, forwarded to one or more intermediary nodes inside the portion of the network, and eventually received by an egress node which may be located at one other edge of said portion of the network.

In some embodiments, the reception of a synchronization message includes an amendment of the synchronization message. The synchronization message may be amended by timestamps which may be added to one or more fields of the synchronization message. Further on, the synchronization message may be amended in one or more fields of the synchronization message which are sometimes referred to as correction fields.

In some embodiments, a node receiving the synchronization message may generate a timestamp. The node receiving the synchronization message may further amend the synchronization message and forward the synchronization message to one or more nodes.

In some embodiments, a determination of the residence time may include a determination of an approximated residence time prior to calculating an adjusted residence time therefrom with an additional consideration of two correction factors.

BRIEF DESCRIPTION OF THE DRAWINGS

The objects as well as further advantages of the teachings of the present disclosure will become more apparent and readily appreciated from the following description of the preferred embodiments, taken in conjunction with the accompanying drawings in which.

DETAILED DESCRIPTION

The first correction factor may be a ratio of a master clock frequency and a clock frequency measured at the ingress node. The first correction factor may be derived from a parameter currently applied in the present IEEE 1588 protocol (refer to chapter 6.6.6.2 of the draft document D1.6 entitled»Draft Standard for a Precision Clock Synchronization Protocol for Networked Measurement and Control Systems«, edited by the IEEE Instrumentation and Measurements Society on August, 2019) which is referred to there as»cumulativeRateRatio«.

The second correction factor may be a ratio of a clock frequency measured at the ingress node and a clock frequency measured at the egress node. Determining the adjusted residence time may include a calculation of a product of the approximate residence time, the first correction factor, and the second correction factor. The approximated residence time equals the adjusted residence time when both correction factors are one, i.e. the neutral element of multiplication.

In some embodiments, there is a generalization of a transparent clock being embodied in a monolithic device towards a portion of a network functionally forming a transparent clock. The first correction factor can be reused or derived from a parameter currently applied in the present IEEE 1588 protocol and thus prepare the determination of an adjusted residence time pertaining to a portion of network by additionally considering a second correction factor according to the present embodiments.

Figure 1:
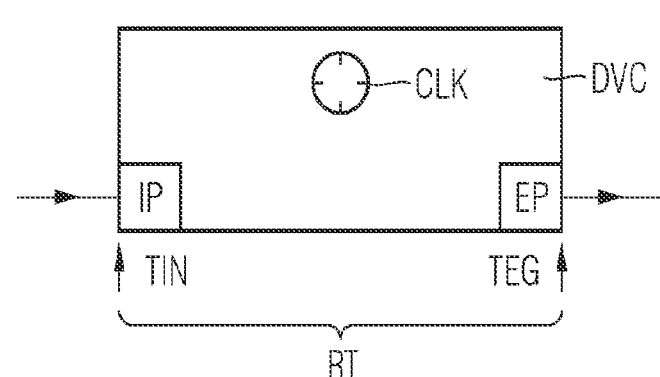
FIG. 1 is a block diagram of a transparent clock in a monolithic device incorporating teachings of the present disclosure.

FIG. 1 shows a conventional transparent clock DVC in a single device incorporating teachings of the present disclosure and having an ingress port IP and an egress port EP. The ingress port IP and the egress port EP may be implemented as network interfaces or wireless network interfaces. Both, ingress port IP and egress port EP, necessarily a device-internal clock signal distributed by a clock CLK integrated within the conventional transparent clock DVC.

The clock signal is generally understood as a physical signal that has periodic events. The periodic events mark the significant instants at which a time counter is incremented. The clock signal is characterized by its frequency and phase.

Synchronization or an act of synchronizing is generally understood as an adjustment of two electronic circuits, devices or nodes so as to operate at the same time. Syntonization or an act of syntonizing is generally understood as an adjustment of two electronic circuits, devices or nodes so as to operate at the same frequency. Hereinafter, synchronization or an act of synchronizing may be construed as synchronization including a syntonization.

A receipt of a synchronization message by the ingress port IP of the transparent clock DVC is symbolized by an arrow pointing towards the ingress port IP. At the time of receipt TIN an ingress timestamp is generated by the ingress node IP.

An egress of the synchronization message by the egress port EP of the transparent clock DVC is symbolized by an arrow leading away from the egress port EP. At the time of egress TEG an egress timestamp is generated by the ingress node IP.

The determining residence time of the synchronization message is calculated as a difference of the egress timestamp and the ingress timestamp.

Figure 2:
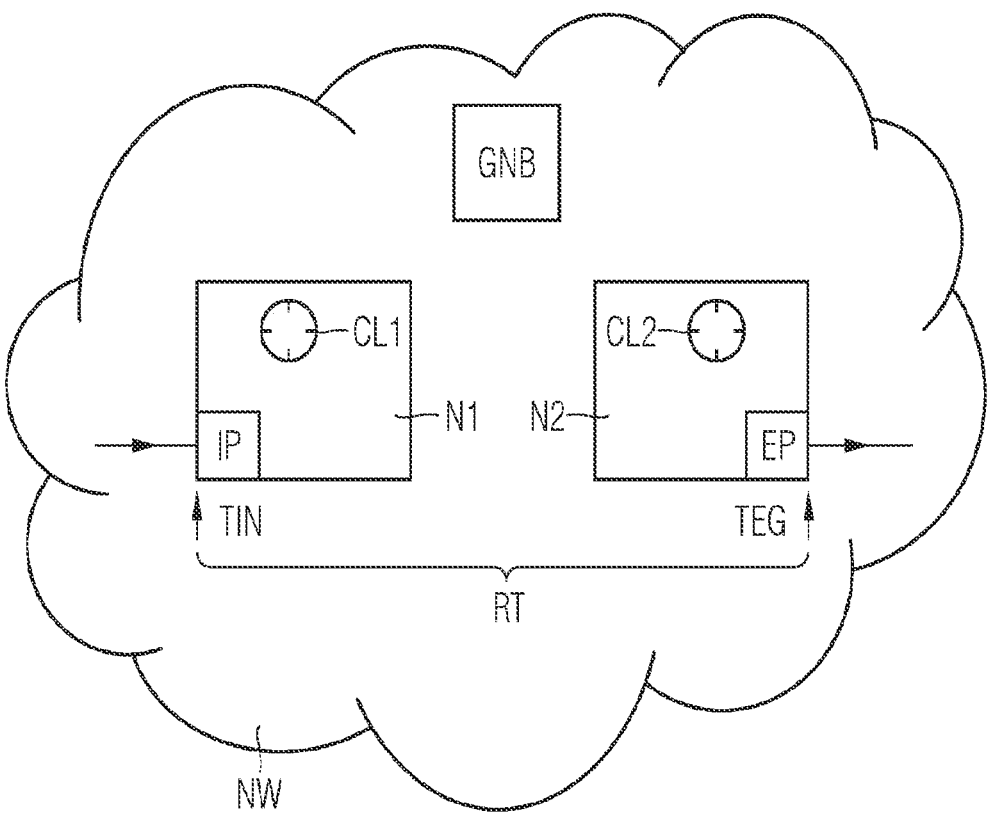
FIG. 2 is a block diagram of a portion of a network functionally forming a transparent clock incorporating teachings of the present disclosure.

FIG. 2 shows a block diagram of a portion of a network functionally forming a transparent clock incorporating teachings of the present disclosure. Contrasting the implementation of FIG. 1, the embodiment shown in FIG. 2 encompasses at least two nodes, here an ingress node N1 and an egress node N2 according to an exemplary implementation, which, although sharing a common network NW, may be physically separated from each other.

The separation of nodes may particularly mean that each of said nodes N1, N2 has its own clock CL1, CL2. Both clocks CL1, CL2 may be physically separated from each other. The network NW or a portion of the network NW may include both nodes N1, N2.

In some embodiments, said nodes N1, N2 may be part of a multinode system with distributed local clocks CL1, CL2. The nodes N1, N2 participating in the multinode system may be connected together through a system interconnect to facilitate communication between the nodes N1, N2. In some applications, the nodes N1, N2 may be divided into physical partitions, or domains, wherein each physical partition is capable of operating as a separate computer.

Keeping consistent time among the nodes N1, N2 in the network NW is a fundamental requirement. The internal clocks CL1, CL2 of the nodes N1, N2 are usually not accurate enough and tend to drift apart from each other over time, generating inconsistent time values. Accordingly, a clock synchronization and/or syntonization may be necessary in regular time intervals.

Clock synchronization in packet based networks NW has been subject of study for many years. Standards for a synchronization within networks NW include the Network Time Protocol or NTP and the Precision Time Protocol or PTP. The Precision Time Protocol gives superior performance by achieving sub-microsecond or even nanosecond accuracy.

Clock synchronization is particularly essential for time sensitive networks or TSN. Time sensitive networks can be generally defined as networks that may communicate at least some time sensitive data. As such, time sensitive networks need to be capable of communicating time sensitive data within an acceptable amount of time. While many of today's communications networks follow a best-effort approach, a best-effort approach is generally not suitable for time sensitive applications because even minor delays in the transmission and/or delivery of time sensitive content is unacceptable for such applications.

Time sensitive networks are a key challenge in a network infrastructure of flexible industrial production lines. Factories of the future encounter a growing data traffic among industrial devices. Wireless technologies for exchanging data penetrate industrial plant environments due to the advantages that these technologies possess over wired solutions. To that end, ubiquitous wireless network coverage within industrial environments is paramount. Strict real-time communication requirements have to be met irrespective of the underlying technology.

Communication networks have progressed through several different generations of technology and are sometimes referred to by a generation index such as 3G, or 4G for third or fourth generation networks. Access nodes in LTE—or above 4G wireless networks—can include a RAN Node such as a Node B (also commonly denoted as evolved Node B, enhanced Node B, eNodeB, or eNB) and/or Radio Network Controller or RNC. In fifth generation or 5G wireless networks, Access nodes can include a 5G Node, e.g., 5G eNB or gNB. The access nodes communicate with wireless user equipment, which is commonly referred to as user equipment or UE.

Current standardization efforts focus on fifth generation or 5G wireless networks combined with a time sensitivity of the network to form a 5G wireless communication network having TSN capabilities or, in other words, operating as a 5G-TSN integrated network NW. Respective wired communication technologies may complete the wireless capabilities of the 5G wireless communication network to form a hybrid network which is also referred to as converged network.

In order to integrate 5G communication networks and TSN networks, the 5G communication network may act as a TSN Bridge towards the TSN network. For the sake of time synchronization over this TSN Bridge, the 5G network or portion of said 5G network in its entirety should behave like a transparent clock.

There is, however, a critical difference between a typical TSN transparent clock according to the embodiment shown in FIG. 1 and a 5G transparent clock as shown in FIG. 2. While the TSN transparent clock is a single device DVC which means that all its different ethernet ports may use the same physical clock CLK, e.g. for time stamping operations, the TSN Bridge transparent clock according to FIG. 2 has at least two different nodes N1 and N2 act using different physical clocks CL1, CL2. This separation may introduce significant errors into the time synchronization procedure in an integrated 5G-TSN network NW.

In some embodiments, the network NW shown in FIG. 2 is at least partially operated as a 5G wireless communication network having TSN capabilities or, in other words, operating as a 5G-TSN integrated network NW. The 5G-TSN integrated network NW may include one or more access nodes GNB wirelessly communicating with and/or controlling one or both nodes N1 and N2 acting as user equipment or UE.

Both nodes N1 and N2 acting as UE may be synchronized to a 5G master clock which may be implemented in one or more access nodes GNB. The residence time RT according to the embodiment illustrated in FIG. 2 may be approximately calculated as described for FIG. 1.

In the current application example according to FIG. 2, however, the ingress timestamp TIN is determined using the first clock CL1 of the ingress node N1, and the egress timestamp TEG is determined based on the second clock CL2 of the egress node N2 which means, as already emphasized, that the clocks CL1, CL2 are operating independently.

Although the IEEE 1588 provides a correction factor entitled»cumulativeRateRatio«(see 11.5.3.2.8 of the draft standard document as recited above) or CRR, this correction factor only compensates a frequency error between a master clock or a grandmaster clock and the clock of the ingress node N1, which is the timestamping clock of the PTP instance according to the standard.

Rather than dismissing this correction factor CRR for the purpose of determining a residence time of a synchronization message traversing a portion of a network, the present embodiments introduce a second correction factor while still using the CRR as a first correction factor.

In order to further compensate for the frequency offset between the second clock CL2 of the egress node N2 and the first clock of the ingress node N1, the adjusted residence time calculation is proposed as:

$$T_{r,5G} = CRR * RR_{5G}(T_{eg} - T_{in})$$

Wherein $T_{r,5G}$ is the adjusted residence time in the portion of the network NW, here: the 5G Network NW.

Wherein CRR is the first correction factor being identical to the»cumulativeRateRatio«or CRR as described above. The first correction factor is the ratio of a master clock frequency and a clock frequency measured at the ingress node N1.

Wherein $T_{eg}$ is the time of egress TEG of the synchronization message at the egress port EP of the second node CL2.

Wherein $T_{in}$ is the is the time of receipt TIN of the synchronization message at the ingress port IP of the first node CL1.

Where $RR_{5G}$ is the second correction factor or the ratio of the clock frequency $f_{N1}$ measured at the ingress node N1 and the clock frequency $f_{N2}$ measured at the egress node N2:

$$RR_{5G} = \frac{f_{N1}}{f_{N2}}$$

In some embodiments, some or all determination steps may be carried out in a distributed system and/or by a decentral manner:

a determination of an approximated residence time may be carried out by a first instance located in the network NW;

a determination of the first correction factor may be carried out by a second instance located in the network NW;

a determination of the second correction factor may be carried out by a third instance; and;

a determination of the adjusted residence time may be carried out by a fourth instance.

The instances mentioned above may be communicatively connected by the network NW or a portion of the network. In the alternative, some or all of the instances mentioned above may be located on one or more nodes or may be executed in terms of software on one or more nodes.

The elements and features recited in the appended claims may be combined in different ways to produce new claims that likewise fall within the scope of the present disclosure. Thus, whereas the dependent claims appended below depend from only a single independent or dependent claim, it is to be understood that these dependent claims can, be made to depend in the alternative from any preceding or following claim, whether independent or dependent, and that such new combinations are to be understood as forming a part of the present specification.

While the teachings of the present disclosure has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

What is claimed is:

1. A method for determining a residence time of a synchronization message traversing a portion of a network, the method comprising:

receiving the synchronization message by an ingress node of the network, generating an ingress timestamp by the ingress node, amending the synchronization message by said ingress timestamp and forwarding the synchronization message to one or more nodes;

receiving said synchronization message by an egress node of the network, generating an egress timestamp;

determining an approximated residence time being a difference of the egress timestamp and the ingress timestamp;

determining a first correction factor as a ratio of a master clock frequency and a clock frequency measured at the ingress node;

determining a second correction factor as a ratio of a clock frequency measured at the ingress node and a clock frequency measured at the egress node; and determining an adjusted residence time being a product of the approximated residence time, the first correction factor, and the second correction factor.

2. The method of claim 1, wherein the synchronization message comprises a Precision Time Protocol (PTP) message.

3. The method of claim 1, wherein the synchronization message comprises a Precision Time Protocol (PTP) message used for an end-to-end scheme.

4. The method of claim 1, further comprising measuring a value of the clock frequency at the ingress node.

5. The method of claim 1, further comprising transmitting the correction factors in a correction field of the synchronization message.

6. The method of claim 1, further comprising transmitting the value of the clock frequency with the synchronization message.

7. The method of claim 1, wherein the timestamp is generated by an internal clock of the respective node receiving, amending, or forwarding said synchronization message.

8. The method of claim 1, wherein the portion of said network comprises a fifth generation communication network.

9. The method of claim 1, wherein the portion of said network comprises a time sensitive network or TSN.

10. The method of claim 1, wherein the portion of said network is implemented as a logical time sensitive network or logical TSN bridge.

11. The method of claim 1, wherein the ingress node and the egress node are physically separated.

12. The method of claim 11, wherein the network is a time sensitive network.

13. The method of claim 12, wherein the time sensitive network is a fifth-generation wireless communication network.

14. The method of claim 1, wherein the determining the adjusted residence time being the product of the approximated residence time, the first correction factor, and the second correction factor includes multiplying, by a processor, the approximated residence time, the first correction factor, and the second correction factor.

15. A system for determining a residence time of a synchronization message traversing a portion of a network, the system comprising:

an ingress node for receiving said synchronization message, for generating an ingress timestamp, for amending the synchronization message by said ingress timestamp and for forwarding the synchronization message to one or more nodes;

an egress node for receiving said synchronization message and for generating an egress timestamp;

a processor programmed to determine an approximated residence time being a difference of the egress timestamp and the ingress timestamp, a first correction factor as a ratio of a master clock frequency and a clock frequency measured at the ingress node, a second correction factor as a ratio of a clock frequency measured at the ingress node and a clock frequency measured at the egress node, and an adjusted residence time as a product of the approximated residence time, the first correction factor, and the second correction factor.

16. The system of claim 15, wherein the ingress node and the egress node are physically separated.

17. The system of claim 16, wherein the network is a time sensitive network.

18. The system of claim 17, wherein the time sensitive network is a fifth-generation wireless communication network.

19. The system of claim 15, wherein, to determine the adjusted residence time as the product of the approximated residence time, the first correction factor, and the second correction factor, the processor is further programmed to multiply the approximated residence time, the first correction factor, and the second correction factor.

* * * * *